Oct. 14, 1947.                    C. C. TAYLOR                    2,429,141
                    LIGHT SHIELD FOR TUBULAR ILLUMINATORS
                        Filed Dec. 29, 1944            3 Sheets-Sheet 1
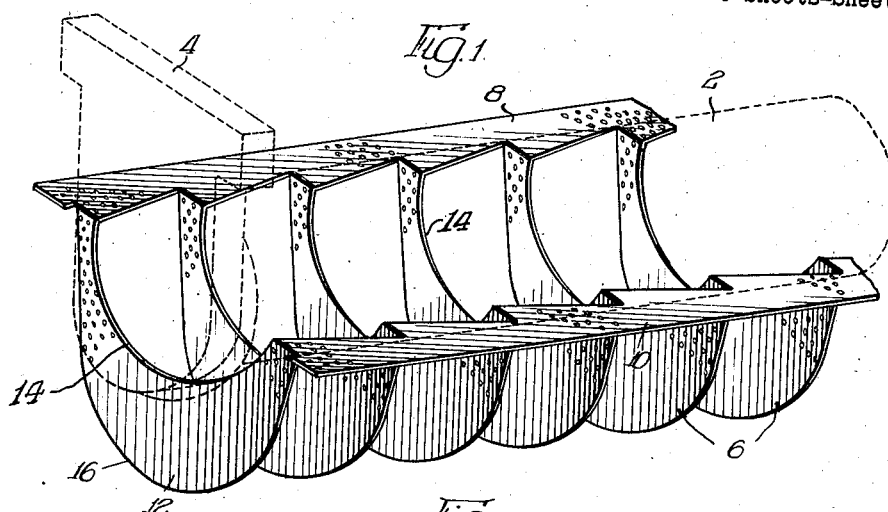
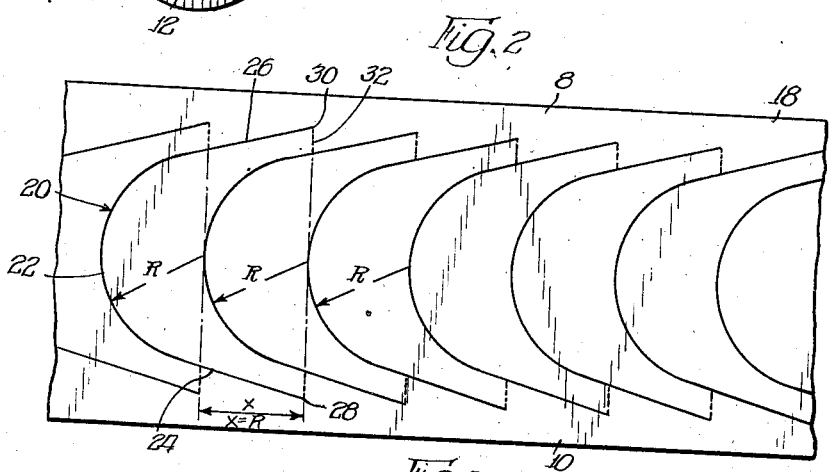
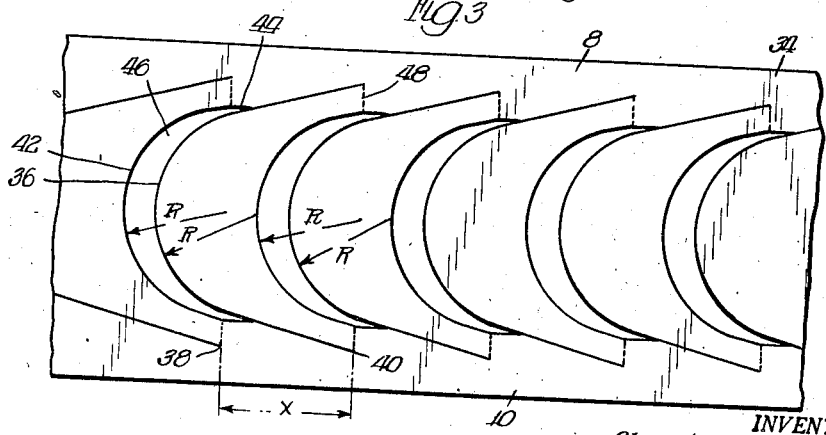
INVENTOR.
Charles C. Taylor,
BY Oct. 14, 1947.   C. C. TAYLOR   2,429,141
LIGHT SHIELD FOR TUBULAR ILLUMINATORS
Filed Dec. 29, 1944   3 Sheets-Sheet 2
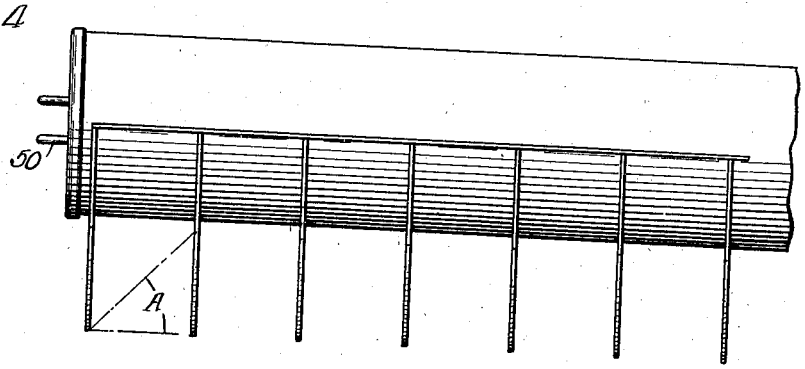
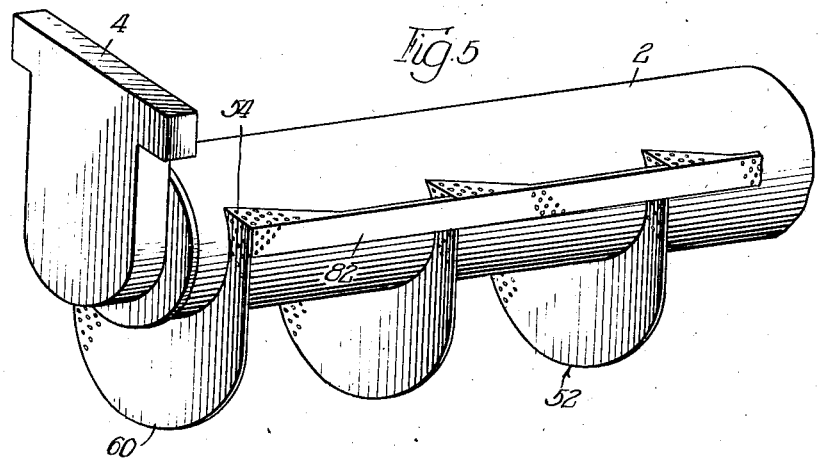
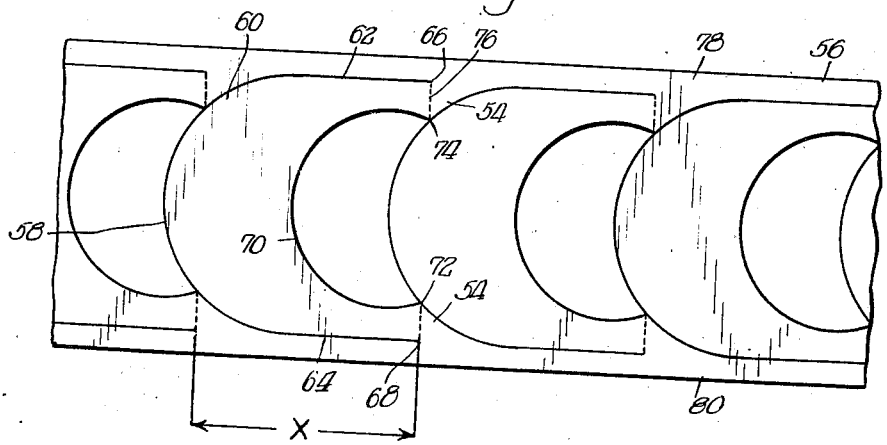
INVENTOR.
Charles C. Taylor,
BY

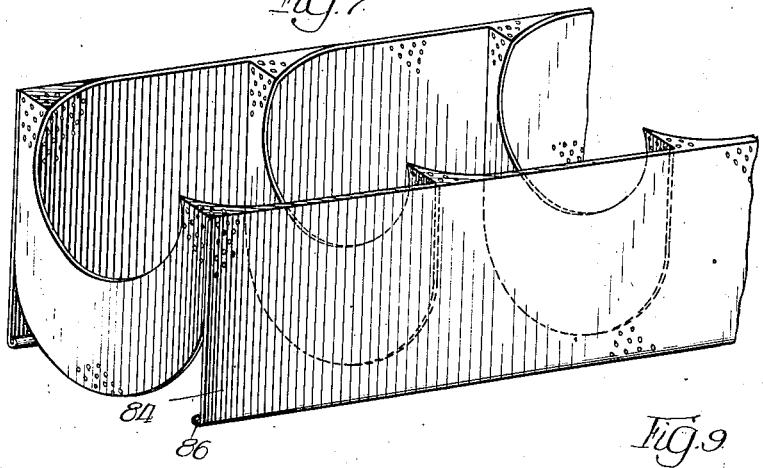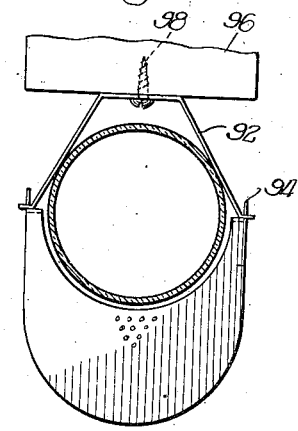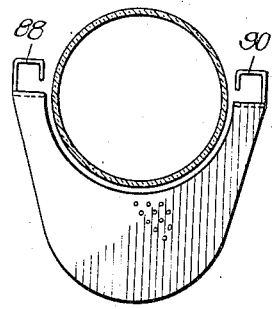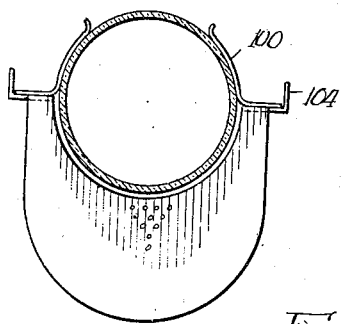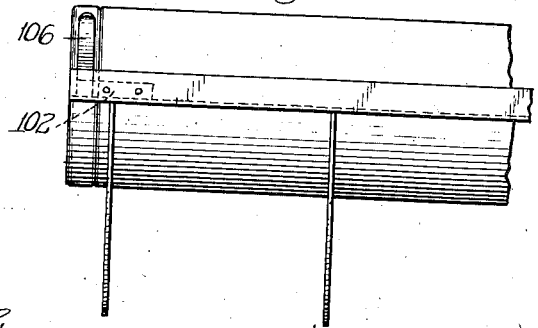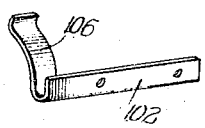

Patented Oct. 14, 1947

2,429,141

UNITED STATES PATENT OFFICE 2,429,141

LIGHT SHIELD FOR TUBULAR ILLUMINATORS

Charles Crombie Taylor, Elburn, Ill., assignor to McStay Jackson and Company, Chicago, Ill., a copartnership composed of G. McStay Jackson and Erla V. Jackson Application December 29, 1944, Serial No. 570,240

4 Claims. (Cl. 240—51.11)

The present invention relates to lighting systems and more in particular to such systems involving the use of an illuminator and a shield associated therewith.

Among the objects of the present invention is to provide a novel lighting assembly involving the use of a shield in conjunction with an illuminator which may be readily and easily fabricated and installed at low cost.

The present invention more particularly contemplates the provision of a shield for an illuminator which may be readily installed or assembled in association with illuminators already installed in place and which will effectively shield transmitted light from the illuminator. The invention further contemplates the provision of an illuminator which is readily adapted for use in connection with new installations as well as illuminators which have already been installed and are now in use.

A still further object within the purview of the present invention is to provide a novel shield which may be easily fabricated from a single sheet of material to maintain the same as a unit for handling and which as a unit is readily installed in place in association with an illuminator.

More particularly, the present invention comprehends the use of a single sheet of material for each shield which may be cut as desired to form portions which, when bent angularly with respect to the original plane of the sheet, form a series of shield elements for shielding the light transmitted from an illuminator with which the same may be associated.

Another object of the present invention is to provide a novel shield for an illuminator cut from a single sheet of material in which the series of shield elements may be formed as desired, preferably such that the depth of such shield elements at their central portion does not exceed the spacing of adjacent shield elements. The present invention is characterized as involving the cutting of the shield elements from a single sheet of material such that the angle whose tangent is equal to the ratio of the depth of the shield elements adjacent their center to the distance between adjacent shield elements varies from 0 to 45 degrees but preferably within the range of from 20 to 45 degrees so that by slight variations in the cutting procedures any desired shielding characteristic of the shield may be secured to accommodate various lighting conditions.

The present invention has the further object of providing a novel shield formed from a single sheet of material in which the marginal rails of the shield are formed with inwardly extending projecting portions adapted to embrace and engage an illuminator for support of the shield as a whole.

Still a further object of the present invention is to provide a novel shield for an illuminator from a single sheet of material in which the method of forming the same contemplates the provision of bending certain portions of the margin out of the plane of the original sheet in order to reinforce the said shield.

Other objects, features, capabilities and advantages are comprehended by the invention, as will later appear and as are inherently possessed thereby.

Referring to the drawings—

Figure 1 is a view in perspective of a lighting assembly involving an illuminator and a shield therefor made in accordance with the present invention;

Figure 2 is a fragmentary plan view of a sheet of material from which the shield according to Figure 1 is made;

Figure 3 is a fragmentary plan view similar to Figure 2 disclosing a modified method of forming a shield similar to the shield shown in Figure 1 of the drawings;

Figure 4 is a fragmentary view in side elevation of a lighting assembly including an illuminator and a further modified form of shield made in accordance with the present invention;

Figure 5 is a fragmentary view in perspective of the lighting assembly shown in Figure 4 of the drawings;

Figure 6 is a fragmentary plan view of a sheet of material showing modifications in the cutting thereof to provide the shield of Figures 4 and 5;

Figure 7 is a fragmentary view in perspective of a shield conforming substantially to that shown in Figure 5 of the drawings but being modified in certain respects in accordance with the present invention;

Figure 8 is a view in cross-section of a lighting assembly disclosing a formation for the shield to provide additional rigidity;

Figure 9 is a view in cross-section of a lighting assembly disclosing means for mounting the shield in association with the illuminator;

Figure 10 is a view in cross-section of a lighting assembly disclosing a further modified form of mounting for the shield;

Figure 11 is a fragmentary view in elevation of the light assembly shown in Figure 10 of the drawings; and Figure 12 is a view in perspective of clips used in mounting the shield of Figures 10 and 11 in association with the illuminator.

Referring now more in detail to the drawings, an embodiment of the invention is disclosed in Figure 1 of the drawings as comprising an elongated illuminator 2 of well-known construction having its electrodes mounted in a conventional fitting such as 4 which may be attached to any support in any desired manner. Associated with the illuminator is a shield 6 consisting of the opposed side rails 8 and 10 between which are dependently disposed a series of shield elements 12 in spaced relation to one another. Each of said shield elements is formed with an upper edge 14 adapted to surround or embrace the illuminator 2 and a lower edge 16 curved in somewhat the same manner as the edge 14 so as to provide a series of baffles or shields for intercepting light transmitted from the illuminator, yet effectively permitting the projection of light into desired areas as regulated by the spacing of the individual shield elements.

As one of the novel aspects of the present invention, such shield 6 is conveniently and readily manufactured from a single sheet of material 18 as shown in Figure 2 of the drawings which is stamped or cut as at 20 in spaced relation to one another throughout the length of the sheet 18 to form a shield of the desired length and with a depth for the shield elements as desired. According to this form of the invention, the cuts 20 are provided with a central curved portion 22 having a radius of curvature equal to R and which cuts are extended outwardly, as at 24 and 26, and terminate at 28 and 30, respectively. In the formation of the shield according to the diagram shown in Figure 2, the depth R of each successive shield element is equal to the distance between the terminal points of successive cuts made in the sheet. These terminal points 28 and 30 are spaced from the next successive cuts as well as the marginal edges of the sheet to provide the rail portions 8 and 10 corresponding to those similarly identified in Figure 1 of the drawings. The cuts 20 may be conveniently formed as by stamping or the like whereby the same are simultaneously formed, after which the portions between successive cuts are bent along the lines, such as 32, at the terminal points 28 and 30, whereby the shield elements may be disposed in a plane substantially normal to the original plane of the sheet 18.

According to the method of producing the shield shown in Figure 2 of the drawings, the depth of each of the shield elements at its central portion is equal to the distance between adjacent elements so that the maximum angle of interference for light transmitted from the illuminator is equal to an angle whose tangent is equal to the ratio of the depth of the shield elements at their central portion to the distance between adjacent shield elements. Since $X=R$ in this particular instance, the angle of interception is equal to 45 degrees.

The method of forming a shield broadly disclosed in Figure 2 of the drawings lends itself readily to the formation of shields in which the angle as above defined may vary from 0 to 45 degrees. As a further illustration of a shield in which the angle of interception is somewhat less than that of the shield disclosed in Figures 1 and 2, reference may be made to Figure 3 of the drawings wherein the same is likewise formed from sheet material represented as 34 having a series of alternate cuts 36 conforming substantially to the cuts 20 in Figure 2 of the drawings. In this particular instance, however, the distance between the terminal points 38 and 40 for such cuts is somewhat greater than the radius of curvature R for the central portion of the cuts 36. By maintaining a radius of curvature R the same as the corresponding radius of curvature for the cuts 20 as shown in Figure 2 and increasing the distance between adjacent terminal points for such cuts, variation in the angle of interception may be readily secured.

Each other alternative cut is represented by reference numeral 42 which has a radius of curvature likewise equal to R but whose center is spaced from the center of the radius for the cut 36 a distance equal to the increase of the X distance over the spacing of the terminal points of the cuts of Figure 2. Each of these alternate cuts 42 includes portions 44 terminating in the next adjacent alternate cut 36, thus leaving a portion of the original sheet 46 which is removed after the cutting takes place. As in the modification shown in Figure 2 of the drawings, the shield elements formed between adjacent alternate cuts 36 and 42 are bent along the lines represented as 48 at the terminal points 38 and 40 out of the plane of the original sheet and into a position substantially normal to the marginal portions 8 and 10 forming the rails of the shield.

By increasing the distance X to any desired amount and maintaining cuts 36 and 42 as disclosed in Figure 3 of the drawings, any suitable angle of interception may be provided in a shield of the type herein disclosed.

Figures 4 and 5 disclose a further assembly for a shield and an illuminator, the illuminator 2 being substantially the same as the illuminator shown in Figure 1 of the drawings and which is provided with electrodes 50 mounted in the conventional fitting 4, all in accordance with the previous disclosure. The shield 52 of this embodiment conforms substantially to the shields shown in Figures 1–3, inclusive, except that the same is formed with a plurality of projecting elements 54 spaced apart a distance less than the diameter of the illuminator 2 whereby the shield embraces said illuminator and is supported in operative position thereby.

This shield is likewise cut or stamped from a single sheet of material 56 as shown in Figure 6 of the drawings, the said material being formed with a series of alternate cuts such as 58 defining the bottom edge of the shield elements 60 and each of which cuts has its central portion of curved formation merging into cuts 62 and 64 extending substantially parallel to the marginal edges of the sheet and terminating as at 66 and 68, respectively. The alternate cuts 58 terminate at the points 66 and 68 in spaced relation which in the illustrative embodiment is represented by the distance marked X. The other alternative cuts such as 70 and which form the inside edge of the shield elements 60 are of curved formation having a radius of curvature slightly greater than the radius of curvature of the illuminator 2 and which cuts extend to and merge with the next adjacent alternate cuts 58 as at 72 and 74, the angular extent of such cuts being greater than 180 degrees so as to provide the projections 54 between successive sets of cuts.

As in the illustrations of Figures 2 and 3, the shield elements are bent out of the plane of the original sheet along the lines 76 to a position substantially normal to the marginal edge portions 78 and 80 constituting the rails for the sheet. In the present illustration, marginal portions such as 82 are likewise bent out of the plane of the original sheet and downwardly to reinforce the rails and to provide a rigid construction. It will be clearly apparent that upon bending of the individual shield elements the inwardly projecting portions 54 are spaced a distance apart less than the diameter of the illuminator and accordingly the illuminator must be moved longitudinally of the shield in assembling the two together. When assembled, however, the projections 54 engage the illuminator and the shield is accordingly wholly supported thereby.

The distance X between the terminal points for each of the shield elements may be increased as desired with a corresponding increase in the depth of the shield elements adjacent their central portion so as to provide shield elements in which the angle of interception may be varied as requirements dictate.

The angle of interception hereinbefore referred to and which may be varied all in accordance with the prior disclosures as well as in the shield construction according to Figure 6 is that angle represented as "A" in Figure 4 of the drawings and is measured by its tangent which is equal to the ratio of the depth of the shield elements at their central portion and the distance between adjacent shield elements, such distance being measured in each instance between the terminal points of the cuts forming the adjacent shield elements. Such angle may be varied by forming the cuts in a pre-determined manner to secure the results desired for any particular installation.

If so desired, the shield made in accordance with the disclosure of Figure 6 may be formed as shown in Figure 7 to provide a depending skirt 84 at the marginal portions on both sides of the shield elements and which may have the rolled finished edges such as 86. Such skirts function to intercept transmitted light laterally of the lighting assembly which may be desirable in certain instances.

Furthermore, in accordance with the disclosure in Figure 8, any of the shields hereinbefore described may have their marginal edges bent to conform to the rails 88 and 90 in order to reinforce the shield structure and to provide, as particularly desirable in the shield shown in Figure 1, for a connection for securing the shield in assembled relation with the illuminator.

In supporting the shield of Figure 1 of the drawings, some such arrangement as is shown in Figure 9 may be employed. In this illustration, clips 92 which have their ends secured in the upstanding flanges 94 of the shield may be secured to the support 96 through the medium of a screw 98 or the like, such clips being disposed in spaced relation longitudinally of the lighting assembly.

In addition to the arrangement shown in Figure 9 of the drawings for supporting the shield, a shield made in accordance with that disclosed in Figure 1 may be mounted in association with the illuminator through the medium of a plurality of clips 100. Each of these clips, as more particularly shown in Figure 12 of the drawings, comprises a securing leg 102 adapted to be secured through the medium of bolts or the like to the upstanding flange 104 of the rails for the shield, and a spring finger 106 adapted to engage the illuminator. These clips are secured in opposed relation to the rails of the shield and in spaced relation longitudinally of the shield as desired for mounting the shield in association with the illuminator.

While I have herein described and upon the drawings shown illustrative embodiments of the invention and processes for making the same, it is to be understood that the invention is not limited thereto but may comprehend other constructions, arrangements of parts, details and process steps without departing from the spirit of the invention.

What is claimed is:

1. In a lighting system, the combination of a tubular illuminator, a light shield associated therewith and comprising an integrally formed member having flat horizontal side rails including substantially triangular flat horizontal portions disposed upon opposite sides of the illuminator inwardly of the rails, a plurality of shield elements depending vertically from said portions and integrally connected thereto along lines extending transversely of the shield, said shield elements having arcuate upper surfaces partially encircling the tubular illuminator and being spaced apart a distance not less than the depth of the central portion of a shield element.

2. A lighting system according to claim 1, in which the arc of the upper edge of the shield element exceeds 180° and its dimensions are so related to the diameter of the tubular illuminator that it is supported thereby.

3. A lighting system according to claim 1, in which means extend inwardly from the side rails to engage the tubular illuminator and support the shield thereon.

4. A lighting system according to claim 1, in which the flat horizontal side rails are provided at their outer edges with marginal flanges extending at substantially right angles to the rails.

CHARLES CROMBIE TAYLOR.

REFERENCES CITED

The following references are of record in the file of this patent:

UNITED STATES PATENTS

| Number | Name | Date |
| --- | --- | --- |
| 1,471,024 | David | Oct. 16, 1923 |
| 1,553,812 | Gillott et al. | Sept. 15, 1925 |
| 1,615,358 | Chub | Jan. 25, 1927 |
| 2,139,005 | Doane | Dec. 6, 1938 |
| 2,221,954 | Schepmoes | Nov. 19, 1940 |
| 2,299,276 | Kirlin | Oct. 20, 1942 |
| 2,319,572 | Wilson | May 18, 1943 |
| 2,337,803 | Deline | Dec. 28, 1943 |
| 2,353,182 | Niederauer | July 11, 1944 |
| 2,358,811 | Kloner | Sept. 26, 1944 |
| 2,366,224 | Warp | Jan. 2, 1945 |